J. J. SIMMONDS.
TILE CUTTER.
APPLICATION FILED JUNE 17, 1918.
1,275,775. Patented Aug. 13, 1918.
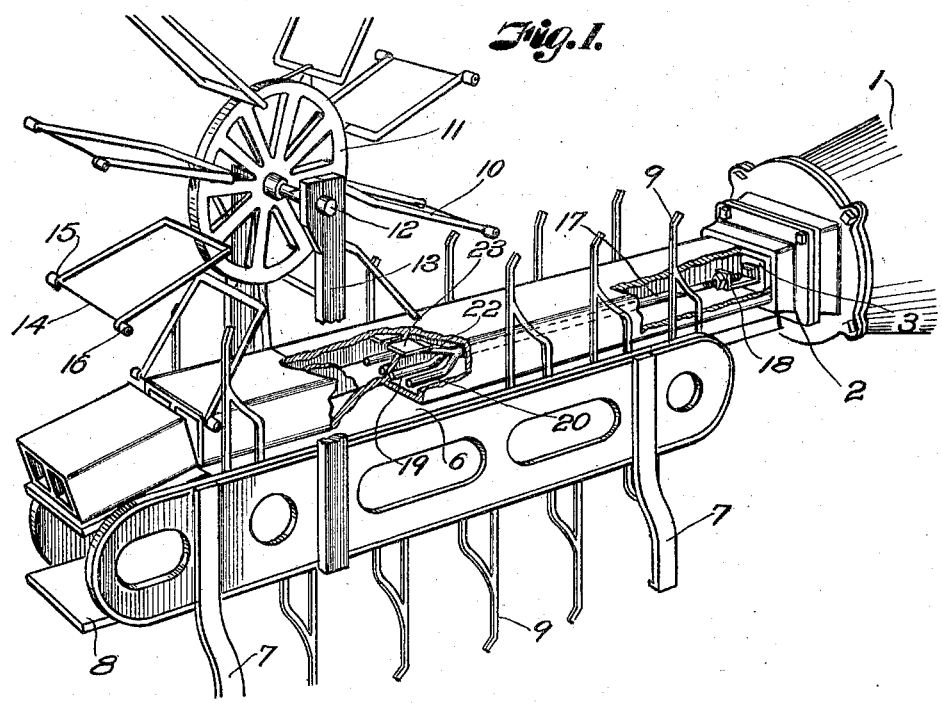
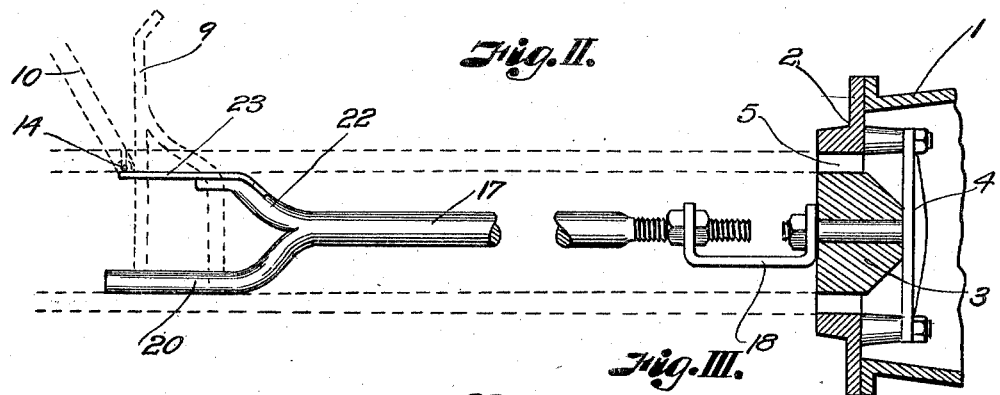
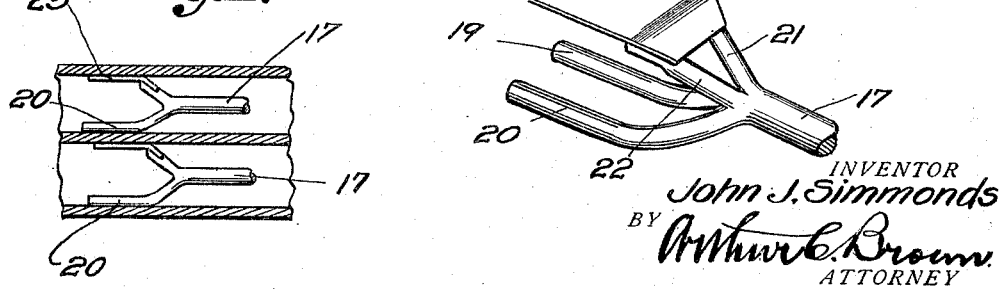
INVENTOR
John J. Simmonds
BY
Arthur E. Brown
ATTORNEY

UNITED STATES PATENT OFFICE.

JOHN J. SIMMONDS, OF LAWRENCE, KANSAS.

TILE-CUTTER.

1,275,775.

Specification of Letters Patent.

Patented Aug. 13, 1918.

Application filed June 17, 1918. Serial No. 240,300.

*To all whom it may concern:*

Be it known that I, JOHN J. SIMMONDS, a citizen of the United States, residing at Lawrence, in the county of Douglas and State of Kansas, have invented certain new and useful Improvements in Tile-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the manufacture of hollow tile and particularly to a cutter for severing the extruded column in appropriate lengths to serve as structural blocks.

The tile is usually made by a machine which extrudes a plastic material through a die space in the end of the cylinder, the extruding being performed by a plunger or screw expressing-element and then the hollow column is cut into appropriate lengths. Inasmuch as the extended column is still in a plastic state, considerable difficulty has heretofore been experienced in preserving the shape of the tile during the cutting operation, as the pressure on the walls from the cutter has a tendency to distort the tile, particularly at the edges.

One of the objects of my invention is to effectively cut the tile in appropriate lengths and at the same time preserve the symmetrical form of the finished article.

In carrying out my invention, I preferably provide a wall-sustaining device or devices over which the hollow column passes preparatory to being cut and this wall sustaining device is generally arranged in close proximity to the point of severance, so that when the cutting pressure is applied to the plastic material, the wall sustaining device will offer resistance to any tendency of the walls to disrupt.

In the drawings:

Figure I is a perspective view of the cutting machine constructed in accordance with my invention, part of the tile being broken away to disclose the manner of securing the sustaining device to the tile press.

Fig. II is a side elevational view of one of the sustaining devices, the discharge end of the tile press being shown in section.

Fig. III is an enlarged detail perspective view of one end of one of the wall sustaining devices.

Fig. IV is a side elevational view of the ends of a group of these.

1 designates the cylinder of a tile machine provided with a nozzle 2 within which is a die or form 3 sustained in position by the supporting bar 4 so as to provide a space 5 through which the plastic material may be extruded.

The wall sustaining device may be used with any form of cutter, but for the purposes of explanation I have shown it applied to a known construction of cutter which may be briefly described as follows:

In front of the discharge end of the tile machine is a conveyer table 6 supported on legs or standards 7. The conveyer consists of a plurality of sections 8 joined together in an endless carrier, movement being imparted to the conveyer by the friction of the tile form as it is discharged from the tile machine. The sections 8 are preferably of a size, co-extensive with that of the tile as will appear hereinafter.

On the conveyer is a plurality of vertical guide arms 9 which also serve the purpose of cutter actuators for imparting movement to the cutter frame 10 radially disposed about the periphery of the wheel 11 mounted upon the axle 12 in the supporting standards 13 above the conveyer. The cutters consist of wires 14 and oppositely disposed upon the frames 10 are rollers or idlers 15 and 16 which bear against the oppositely located guide arms 9 on the conveyer.

From the foregoing it will be apparent that as the extruded tile column is disposed upon the conveyer and forced from the tile machine, the friction of the formed mass upon the conveyer will cause it to move forward and with it the arms 9. As the arms 9 come into contact with the rollers 15 and 16, the cutting wires 14 will be moved into cutting contact with the tile form so as to sever it into appropriate lengths.

In actual experience with a machine constructed as above described, I have found that the walls of the tile not only become distorted but not infrequently the edges of the tile are disrupted by the wires.

In order to overcome the above tendency, I have provided wall sustaining devices which in actual practice I have found will resist any tendency of disruption of the walls during the cutting operation. The wall sustaining devices are shown as each consisting of the stem or rod 17 secured to the core of a die 3 by a bracket 18 and the free end of the stem being provided with spread fingers 19—20—21 and 22, the fingers 21 and 22 supporting a cutting table 23. The bracket 18 permits the device to be adjusted longitudinally so that the end of the table within the column may be in close proximity to the path of the cutting wire or edge as the case may be.

The fingers 19 to 21 and the cutting table are disposed within the hollow tile so that the table may resist the downward pressure of the cutting wire 14 and the fingers 19 and 20 have a tendency to press the bottom of the tile firmly against the conveyer. There will be as many wall sustaining devices as there are conduits or air spaces in the tile. For example in Fig. I, I have shown a tile with two spaces, in which event there will be two wall sustaining devices but in Fig. IV the sustaining devices are arranged for a 4 space tile.

From the foregoing it will be seen that as tile column is excluded the wall sustaining device for each space will preserve the configuration of the tile column and that the cutter will start the point of severance in close proximity to the table 23, so that any liability of the tile form being upset at the point of severance will be eliminated.

As heretofore explained the cutter shown is only one type to which my invention is adapted, so I do not limit my device to any particular cutting machine nor to any shape of tile as the invention may be arranged for tile of any desired cross section.

Having thus described my invention, what I claim as new therein, and desire to secure by Letters-Patent, is:

1. In a machine for cutting hollow tile, a wall sustaining means receivable within the tile to oppose the tendency of the wall of the tile column to give, under the pressure of the cutter.

2. In a hollow tile machine, a cutter for severing the tile column into lengths and a wall sustaining table receivable within the hollow portion of the tile column.

3. In a hollow tile machine, a cutter for severing the tile column into lengths, a wall sustaining table receivable within the hollow portion of the tile column to bear against the under side of the upper wall of the tile column during the cutting operation, means bearing against the upper side of the under wall of the tile column and a conveyer upon which the tile column rests.

4. In a hollow tile machine, a cutter for severing the tile column into lengths, and wall sustaining means receivable within the hollow tile, said means being connected to the discharge end of the tile machine.

5. In a hollow tile machine, the combination with the cutting elements of said machine, of a wall sustaining device receivable within the tile column and means for adjusting the device so as to present its free end adjacent to the path of travel of the cutting elements.

6. In a hollow tile machine, a cutter for severing the tile column into lengths, a die at the extruding end of the tile machine and wall-sustaining means receivable within the hollow tile and secured to the die within its perimeter.

7. In a hollow tile machine, the combination with a discharge end of the machine and a hollow tile forming die, of a wall sustaining device comprising a rod projecting from the die and having radial and longitudinally disposed fingers to bear against the inner surfaces of the wall of the tile column and a cutter.

In testimony whereof I affix my signature.

JOHN J. SIMMONDS.